(12) United States Patent
Goetzinger et al.

(10) Patent No.: US 10,427,721 B2
(45) Date of Patent: Oct. 1, 2019

(54) MOUNTING ELEMENT AND MOUNTING ARRANGEMENT IN A VEHICLE

(71) Applicant: MAGNA STEYR Fahrzeugtechnik AG & Co. KG, Graz (AT)

(72) Inventors: Bruno Goetzinger, Weinitzen (AT); Juergen Taucher, Sinabelkirchen (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 26 days.

(21) Appl. No.: 15/808,941

(22) Filed: Nov. 10, 2017

(65) Prior Publication Data

US 2018/0134326 A1 May 17, 2018

(30) Foreign Application Priority Data

Nov. 17, 2016 (EP) ..................................... 16199304

(51) Int. Cl.
*B62D 27/02* (2006.01)
*F16B 7/18* (2006.01)

(52) U.S. Cl.
CPC ........... *B62D 27/02* (2013.01); *B62D 27/023* (2013.01); *F16B 7/185* (2013.01)

(58) Field of Classification Search
CPC ...... B62D 27/025; B62D 27/023; F16B 7/185

USPC .................................. 296/35.1, 35.3, 193.03
See application file for complete search history.

(56) References Cited

U.S. PATENT DOCUMENTS

| 5,486,031 A | * | 1/1996 | Ronchetti | ................ B60J 7/104 |
| | | | | 296/10 |
| 6,435,584 B1 | * | 8/2002 | Bonnville | .............. B62D 24/00 |
| | | | | 280/781 |
| 2005/0196228 A1 | * | 9/2005 | Bruggemann | ....... B62D 23/005 |
| | | | | 403/231 |

FOREIGN PATENT DOCUMENTS

| DE | 102006044799 A1 | 4/2008 |
| EP | 2093434 A1 | 8/2009 |
| WO | 2014187557 A1 | 11/2014 |

* cited by examiner

*Primary Examiner* — Joseph D. Pape
(74) *Attorney, Agent, or Firm* — Jordan IP Law, LLC; Todd A. Vaughn

(57) ABSTRACT

A connecting element to connect a heavy duty component to a hollow profile in a motor vehicle. The connecting element has a profile extension with a rectangular cross-section, and includes a top face and a bottom face of the cross-section of the profile extension. The connecting element also has a flange face with a cross-section protruding beyond the cross-section of the profile extension. The profile extension and/or the flange face has a bore to permit connection to the heavy duty component.

18 Claims, 2 Drawing Sheets

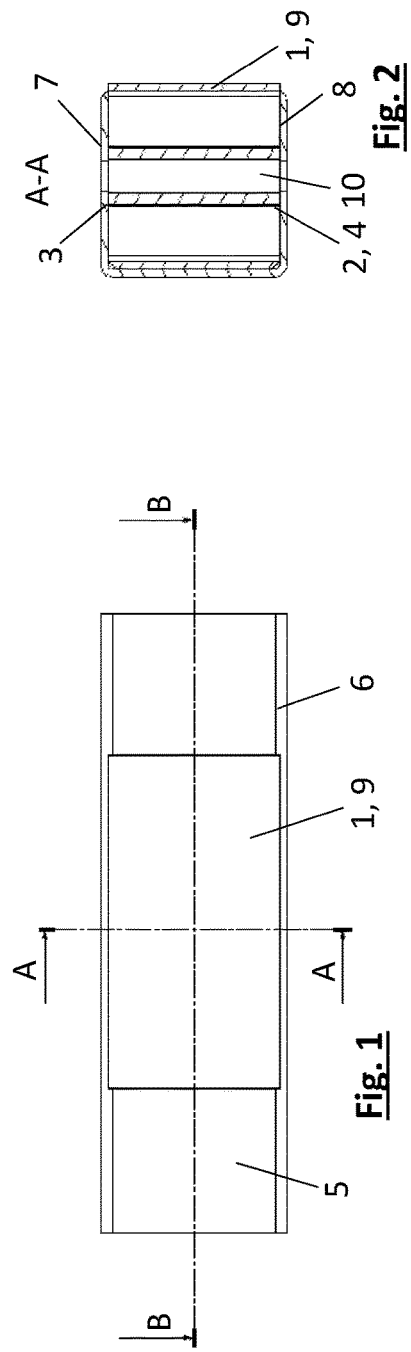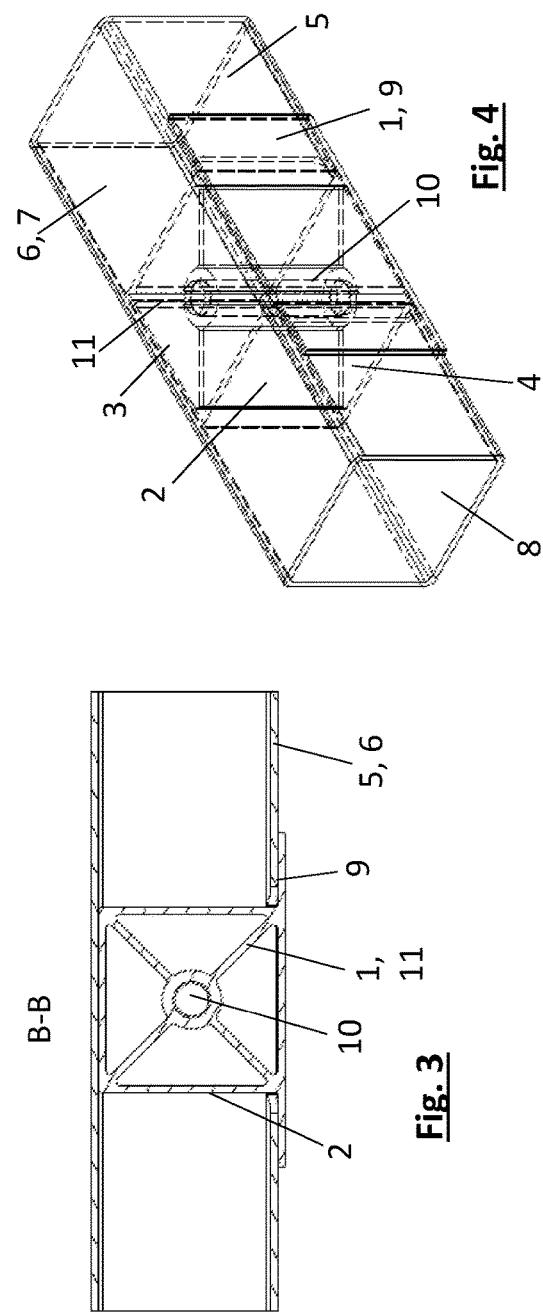

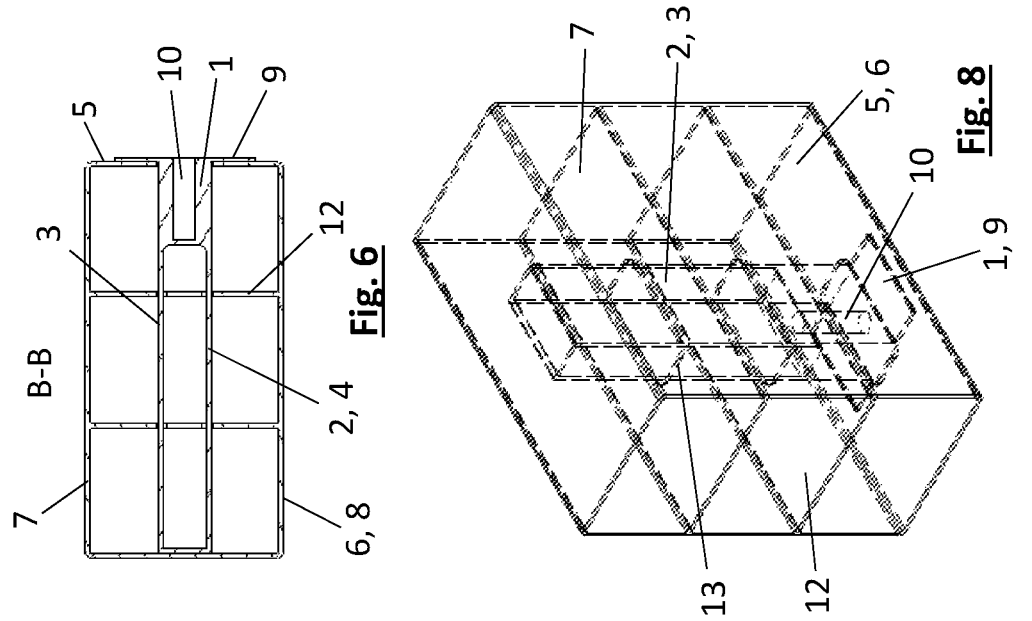
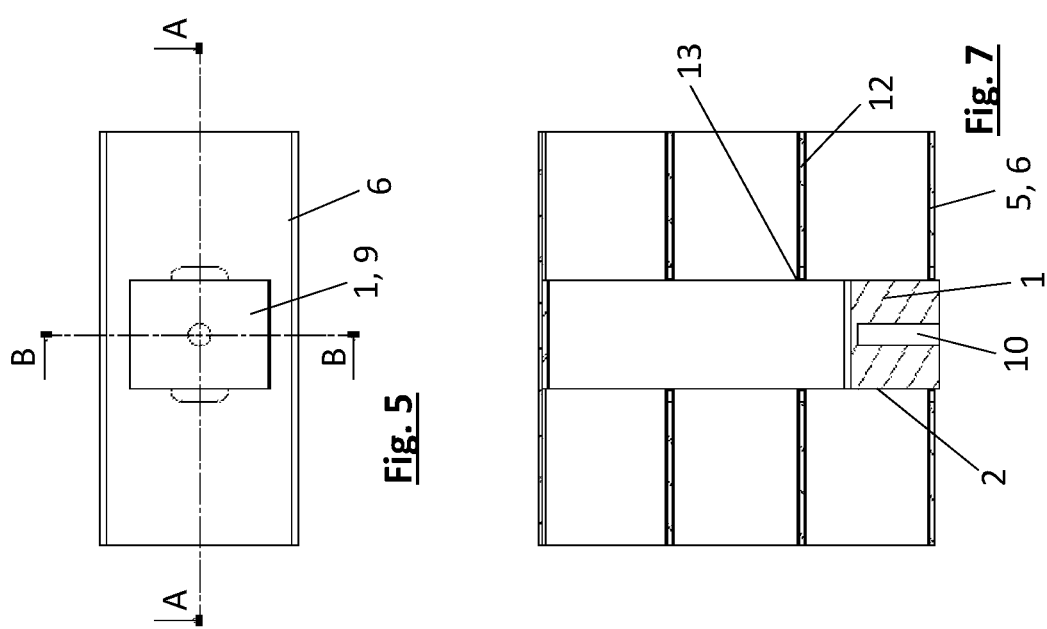

MOUNTING ELEMENT AND MOUNTING ARRANGEMENT IN A VEHICLE

CROSS-REFERENCE TO RELATED APPLICATIONS

The present application claims priority under 35 U.S.C. § 119 to European Patent No. EP16199304.3, filed on Nov. 17, 2016, at the European Patent Office, which is hereby incorporated by reference in its entirety.

TECHNICAL FIELD

Embodiments relate to a connecting element configured to connect a heavy duty component to a hollow profile in a motor vehicle, and a connection arrangement in a motor vehicle comprising such a connecting element, a hollow profile, and a heavy duty component.

BACKGROUND

It is known that in a motor vehicle, components are required which must absorb or dissipate high loads, such as weight, but also forces acting from the outside. Primarily this concerns the body of the vehicle and in general all supporting parts of the vehicle.

To produce a vehicle body, it is known to use profiles in a so-called space-frame construction method. The connection of such profiles of a space-frame body to each other, and the connection of further force-transferring components to these space-frame profiles, impose high requirements for the quality of the connection but nonetheless should be able to be produced economically.

A connecting element of a supporting frame for connection of cross members is known for example from European Patent Publication No. EP 1 130 275 A1.

German Patent Publication No. DE 10 2006 044 799 A1 discloses a body module for a motor vehicle, in particular a car, with a plurality of mutually connected planar elements and carrier profiles, the supporting ends of which must be inserted in receiving openings of further carrier profiles adjoining the body module.

SUMMARY

In accordance with embodiments, a connecting element is provided and configured to connect a heavy duty component to a hollow profile in a motor vehicle, which allows a secure connection with compact structure and low production costs, and a connection arrangement in a motor vehicle comprising such a connecting element.

In accordance with embodiments, a connecting element to connect a heavy duty component to a hollow profile in a motor vehicle may comprise a profile extension having a substantially rectangular cross-section that includes a top face and a bottom face of the cross-section of the profile extension; and a flange face having a cross-section that is configured to protrude beyond the cross-section of the profile extension, wherein at least one of the profile extension and the flange face has a bore configured to connect to the heavy duty component.

In accordance with embodiments, to connect the heavy duty component (for example, a body component or a chassis component) to a hollow profile (for example, a space-frame body), an additional component (for example, the connecting element) is used. The connecting element is configured for insertion, for example, laterally, in the hollow profile via a rectangular extension. The profile extension, therefore, may be supported vertically on an upper delimiting wall and a lower delimiting wall (for example, an upper web and a lower web) of the hollow profile, which already creates security against movement in the vertical direction. In addition, the flange face of the connecting element may rest on the outside against the hollow profile and can thus be bonded superficially to the side wall of the hollow profile.

In contrast to the use of round bushes, which are normally welded into a hollow profile, when a connecting element in accordance with embodiments is used, no welding is required at least as the primary manner of connecting the connecting element to the hollow profile. Thus, the construction space may be saved for a weld seam which would protrude from the hollow profile. If, however, the connecting element is to be welded in addition to bonding or bolting, the heat zone may be positioned more freely so that the cross-section of the hollow profile need not be weakened. Also, the joint zones on the hollow profile are less heavily loaded by the use of the supported profile extension.

In accordance with embodiments, such a connecting element is ideal, for example, for joining a chassis (as the heavy duty component) to a space-frame body (as a hollow profile).

In accordance with embodiments, a "rectangular cross-section" of the profile extension also includes the possibility of a square cross-section.

In accordance with embodiments, the "top face" and "bottom face" of the cross-section of the profile extension need not be complete, closed surfaces formed by material. Rather, merely a support or contact face may be created which is suitable for supporting the component. The bottom face and/or the top face may therefore have openings and may be formed merely by ends of lateral delimiting faces and/or webs.

In accordance with embodiments, a flange face, which has a cross-section which is configured to protrude beyond the cross-section of the profile extension, need not protrude beyond the cross-section of the profile extension in every direction, but may for example protrude beyond the profile extension only in the direction of the top face and/or bottom face and/or perpendicular to the top face and bottom face, so that a contact face may be formed. The flange face may be arranged perpendicular to the profile extension, and in particular, perpendicular to the top face and/or the bottom face of the profile extension. The flange face may be formed as a simple flat surface.

In accordance with embodiments, at least one, or a plurality of reinforcing webs may be formed in the interior of the profile extension. The profile extension may therefore comprise one or more hollow chambers. The profile extension may also be extruded or pultruded, or also be a casting.

In accordance with embodiments, the connecting element may be configured for bonding and/or bolting to the hollow profile.

In accordance with embodiments, the bore which is configured to connect to the heavy duty component may be a threaded bore so that a bolt may be screwed into the threaded bore, or a through hole so that a bolt may be screwed in via a nut on the other end of the profile extension.

In accordance with embodiments, the bore which is configured to connect to the heavy duty component is formed in the profile extension. The bore may be arranged perpendicular to the top face and the bottom face of the profile extension. The bore may be connected to outer faces, i.e. lateral delimiting faces, of the profile extension, in particular, by reinforcing webs.

In accordance with embodiments, the bore which is configured to connect to the heavy duty component may also be formed in the profile extension so that the bore is arranged perpendicular to the flange face.

In accordance with embodiments, reinforcing webs may be formed in the interior of the profile extension. The profile extension may at least in portions consist of a solid material, in particular in a portion in which a bore is made for bolting to the heavy duty component.

In accordance with embodiments, a connection arrangement in a motor vehicle comprises a connecting element as described herein; a hollow profile; and a heavy duty component. Here, the profile extension is introduced into the hollow profile through a side face of the hollow profile so that, in the inside of the hollow profile, the top face and bottom face of the profile extension are oriented parallel to the top face and bottom face of the hollow profile and are supported vertically, directly or indirectly, by the top face and bottom face of the hollow profile. The flange face of the connecting element lies on the outside on the side face of the hollow profile. The heavy duty component is mechanically connected to the bore of the profile extension or the flange face.

In accordance with embodiments, a direct vertical support of the top face and bottom face of the profile extension on the top face and bottom face of the hollow profile may be achieved, in particular, in that the top faces and bottom faces of the profile extension and hollow profile are adjacent to each other, so that they lie against each other or at least almost against each other.

In accordance with embodiments, an indirect support of the top face and bottom face of the profile extension on the top face and bottom face of the hollow profile may be achieved in that supports are arranged between the top faces and the bottom faces of the profile extension and hollow profile, in particular, vertical intermediate walls which extend from the top face or bottom face of the hollow profile to the top face or bottom face of the profile extension.

In accordance with embodiments, the connecting element may be bonded to the hollow profile, in particular, to the side of the flange face facing the hollow profile and/or to the top face and/or to the bottom face of the profile extension. The connecting element may, additionally or alternatively, be screwed and/or riveted to the hollow profile. In addition, the hollow profile may also be welded. Preferably however, the connecting element is not welded to the hollow profile.

In accordance with embodiments, the height of the flange face corresponds to the height of the side face of the hollow profile so that the flange face terminates flush with the hollow profile.

In accordance with embodiments, the side face of the hollow profile, through which the profile extension is guided, may have a height less than the height of the top face and the bottom face of the hollow profile. The side face, therefore, is the smaller face of the hollow profile relative to the top and bottom faces. The side face may extend vertically in the installation position, and the top face and the bottom face then may extend horizontally.

In accordance with embodiments, the hollow profile is a multi-chamber hollow profile, i.e. has inner connecting webs, such that the profile extension is guided preferably through openings in the inner connecting webs. The profile extension may then also lie on the edges of these openings or lie close thereto. The connecting webs then form the vertical supports of the top face and bottom face of the hollow profile.

DRAWINGS

Embodiments will be illustrated by way of example in the drawings and explained in the description below.

FIG. 1 illustrates a top view of a connecting element in a hollow profile, in the direction towards the flange face, in accordance with a first embodiment.

FIG. 2 illustrates a view according to section A-A of FIG. 1.

FIG. 3 illustrates a view according to section B-B in FIG. 1.

FIG. 4 illustrates an isometric view of the connecting element in a hollow profile of FIG. 1.

FIG. 5 illustrates a top view of a connecting element in a hollow profile, in the direction towards the flange face, in accordance with a second embodiment.

FIG. 6 illustrates a view according to section B-B of FIG. 5.

FIG. 7 illustrates a view according to section A-A of FIG. 5.

FIG. 8 illustrates an isometric view of the connecting element in a hollow profile of FIG. 5.

DESCRIPTION

FIGS. 1 to 4 illustrate, in a first embodiment, a connecting element 1 to connect a heavy duty component (not shown) to a hollow profile 6. The connecting element 1 has a profile extension 2 with a substantially rectangular cross-section, for example, a square cross-section, which is delimited at the top by a top face 3 and at the bottom by a bottom face 4.

The profile extension 2 may be guided for receipt into the hollow profile 6 through a side face 5 of the hollow profile 6. In this example, the top face 3 and the bottom face 4 of the profile extension 2 may be formed merely by the ends of lateral delimiting faces and connecting webs 11 of an extruded profile, the extrusion direction of which is also evident from the position of the bore 10. The top face 3 and the bottom face 4 of the profile extension 2 lie on the inside against a large-area top face 7 and bottom face 8 of the hollow profile 6, so that the top face 3 and the bottom face 4 of the profile extension 2 are supported vertically by the hollow profile 6.

The connecting element 1 also has a flange face 9 which has a cross-section protruding beyond the cross-section of the profile extension 2, i.e., having a greater cross-section than the profile extension 2. The part of the flange face 9 which protrudes at least horizontally beyond the cross-section of the profile extension 2 and beyond the opening in the side face 5 of the hollow profile 6, lies on the outside against the side face 5 of the hollow profile 6.

In the embodiment of FIGS. 1 to 4, the profile extension 2 has a bore 10, formed as a through hole, which is configured to establish a mechanical connection of the profile extension 2 to a heavy duty component. The bore 10 may be connected to the outer faces of the profile extension 2 via a plurality of reinforcing webs 11, such as, for example, four reinforcing webs 11 extending diagonally to the corners of the profile extension 2. The connecting element 1 may be joined to the hollow profile 6 by bonding.

FIGS. 5 to 8 illustrate, in a second embodiment, a hollow profile 6 having a multi-chamber hollow profile with inner connecting webs 12 between the top face 7 and the bottom face 8 of the hollow profile 6. The profile extension 2 is guided through openings 13 of the inner connecting webs 12, and thus, may lie against the connecting webs 12, and, in some cases, also be bonded thereto. The connecting webs 12 therefore form a vertical support for the connecting element 1.

In this variant, the bore 10 which is configured to establish a mechanical connection of the profile extension 2 to the heavy duty component is formed through the flange face 9, such as, for example, in the middle of the flange face 9, and extends through a portion of the profile extension 2. The bore 10 is here formed as a threaded bore to receive an external thread of a screw.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE NUMERALS

1 Connecting element
2 Profile extension
3 Top face of profile extension
4 Bottom face of profile extension
5 Side face of hollow profile
6 Hollow profile
7 Top face of hollow profile
8 Bottom face of hollow profile
9 Flange face
10 Bore
11 Reinforcing web
12 Connecting web
13 Opening in connecting web

What is claimed is:

1. A connection element to connect a heavy duty component to a hollow profile in a motor vehicle, the connection element comprising:
   a profile extension having a substantially rectangular cross-section with a top face and a bottom face, and a bore to permit a connection to the heavy duty component, the profile extension being configured for insertion into the hollow profile such that the top face and the bottom face are oriented parallel to and for support by a top face and a bottom face of the hollow profile; and
   a flange face having a cross-section configured to protrude beyond the cross-section of the profile extension to lie against an outer side face of the hollow profile.

2. The connecting element of claim 1, further comprising at least one reinforcing webs formed in an interior of the profile extension.

3. The connecting element of claim 1, further comprising a plurality of reinforcing webs formed in the interior of the profile extension.

4. The connecting element of claim 1, wherein the connecting element is configured for bonding to the hollow profile.

5. The connecting element of claim 1, wherein the connecting element is configured for mechanical connection to the hollow profile.

6. The connecting element of claim 1, wherein the connecting element is configured for at least one of bonding and mechanical connection to the hollow profile.

7. The connecting element of claim 1, wherein the bore comprises a threaded bore.

8. The connecting element of claim 1, wherein the bore comprises a through hole.

9. The connecting element of claim 1, wherein the bore extends perpendicular to the top face and the bottom face of the profile extension.

10. The connecting element of claim 1, wherein the bore is connected to outer faces of the profile extension by reinforcing webs.

11. The connecting element of claim 1, wherein the bore extends perpendicular to the flange face.

12. A connection element to connect a heavy duty component to a hollow profile in a motor vehicle, the connection element comprising:
    a profile extension having a substantially rectangular cross-section with a top face and a bottom face, the profile extension being configured for insertion into the hollow profile such that the top face and the bottom face are oriented parallel to and for support by a top face and a bottom face of the hollow profile; and
    a flange face having a cross-section configured to protrude beyond the cross-section of the profile extension to lie against an outer side face of the hollow profile, the flange face having a bore to permit a connection to the heavy duty component.

13. A connection assembly for a motor vehicle, the connection assembly comprising:
    a hollow profile;
    a heavy duty component; and
    a connecting element including a profile extension with a substantially rectangular cross-section, the profile extension having a top face and a bottom face of a cross-section thereof, and a bore to permit a connection to the heavy duty component, and a flange face which has a cross-section thereof configured to protrude beyond the cross-section of the profile extension,
    wherein:
    the profile extension is configured for introduction into the hollow profile through a side face of the hollow profile, so that in the inside of the hollow profile, the top face and the bottom face of the profile extension are oriented parallel to a top face and a bottom face of the hollow profile, and are supported vertically, directly or indirectly, by the top face and the bottom face of the hollow profile, and
    the flange face of the connecting element extends on an outside against the side face of the hollow profile.

14. The connecting arrangement of claim 13, wherein the connecting element is bonded to at least one of a side of the flange face that faces the hollow profile, the top face of the profile extension, and the bottom face of the profile extension.

15. The connecting arrangement of claim 13, wherein flange face has a height that corresponds to a height of the side face of the hollow profile so that the flange face terminates flush with the hollow profile.

16. The connecting arrangement of claim 13, wherein the side face of the hollow profile has a height through which the profile extension is guided, is less than a width of the top face of the hollow profile and of the bottom face of the hollow profile.

17. The connecting arrangement of claim 13, wherein the hollow profile comprises a multi-chamber hollow profile.

18. The connecting arrangement of claim 17, wherein the multi-chamber hollow profile has inner connecting webs through which the profile extension is guided through openings thereof.

* * * * *